United States Patent [19]

Mori et al.

[11] Patent Number: 5,032,556

[45] Date of Patent: Jul. 16, 1991

[54] PREPARATION METHOD FOR ZIRCON POWDER

[75] Inventors: Toshiyuki Mori, Ebina; Yoshitaka Kubota, Sagamihara; Takashi Mitamura, Urawa; Hidehiko Kobayashi, Saitama, all of Japan

[73] Assignee: Tosoh Corporation, Shinnanyo, Japan

[21] Appl. No.: 481,335

[22] Filed: Feb. 20, 1990

[30] Foreign Application Priority Data

Feb. 21, 1989 [JP] Japan .................................. 1-39430
Apr. 13, 1989 [JP] Japan .................................. 1-91857
Dec. 28, 1989 [JP] Japan ................................. 1-338103

[51] Int. Cl.$^5$ ...................... C04B 35/46; C04B 35/48; C04B 35/49; C01G 23/00
[52] U.S. Cl. .................................. 501/106; 501/102; 501/103; 501/106; 501/134; 501/38; 423/69; 423/76
[58] Field of Search ............... 501/102, 103, 106, 134, 501/38; 423/75, 69, 76, 78

[56] References Cited

U.S. PATENT DOCUMENTS

| 3,216,837 | 12/1965 | McTaggart | 106/57 |
| 3,709,706 | 1/1973 | Sowman | 501/103 |
| 4,152,166 | 5/1979 | Rogers | 106/43 |
| 4,579,829 | 4/1986 | Garvie | 501/106 |
| 4,755,365 | 7/1988 | Funahashi et al. | 423/75 |

Primary Examiner—William R. Dixon, Jr.
Assistant Examiner—Michael Marcheschi
Attorney, Agent, or Firm—Oblon, Spivak, McClelland, Maier & Neustadt

[57] ABSTRACT

A preparation method for zircon powder, which comprises heating a feed powder mixture comprising:

(1) silica and zirconia obtained by subjecting a liquid having a pH of not higher than 8 and containing silica and zirconia in a $SiO_2/ZrO_2$ molar ratio of substantially 1/1, to liquid-removing treatment, and (2) zircon in an amount of at least 0.1% by weight based on the total amount of said silica and zirconia, at a heating rate of not higher than 5° C./min from 1,200° C. to a calcination temperature, and maintaining it at a calcination temperature of from 1,300° to 1,700° C. for from 1.0 to 24 hours.

8 Claims, No Drawings

PREPARATION METHOD FOR ZIRCON POWDER

The present invention relates to a method for synthesizing zircon powder suitable for the production of a sintered product of zircon which is useful as a high temperature structural material.

It is difficult to prepare zircon by merely firing a powder mixture comprising silica and zirconia. It is known that the zircon-forming reaction is facilitated by an addition of various metal oxides having low melting points (Materials, 15(156), 615-620 (1966), Journal of Industrial Chemistry, 70,286 (1967)).

However, when the powder obtained by this method is sintered, the above-mentioned metal oxides create nonuniformity to the composition during the sintering, thus leading to a deterioration of the mechanical properties at room temperature of the resulting sintered product. Further, depending upon the types of metal oxides, a low melting glass phase will remain, which deteriorates the mechanical properties at high temperatures. Such metal oxides are doped in the lattice of zircon and can hardly be removed by e.g. washing.

It is an object of the present invention to solve such problems and to provide a method for synthesizing zircon powder containing no such metal oxide impurities or raw materials and having a small particle size.

The present invention provides a preparation method for zircon powder, which comprises heating a feed powder mixture comprising:

(1) silica and zirconia obtained by subjecting a liquid having a pH of not higher than 8 and containing silica and zirconia in a $SiO_2/ZrO_2$ molar ratio of substantially 1/1, to liquid-removing treatment, and (2) zircon in an amount of at least 0.1% by weight based on the total amount of said silica and zirconia, (a) at a temperature-raising rate of not higher than 5° C./min from 1,200° C. to a calcination temperature, and maintaining it at a firing temperature of from 1,300° to 1,700° C. for from 1.0 to 24 hours; or (b) from 700° to 1,200° C. over a period of at least 16 hours and maintaining it at a temperature of from 1,300° to 1,700° C. for at least 10 hours.

Now, the present invention will be described in detail with reference to the preferred embodiments.

Starting raw materials

With respect to silica, zirconia and zircon as the starting materials of the present invention, there is no particular restriction as to e.g. the methods of their preparation. The silica may be, for example, so-called white carbon synthesized by a wet method or a dry method; a dehydrate of silica sol; an oxidized product of silicon single substance; or a hydrolyzate of a silicon alkoxide such as silicon methoxide, silicon ethoxide, silicon butoxide or silicon propoxide, particularly a tetraalkoxide thereof. The zirconia may be commercially available zirconia powders synthesized from various zirconia compounds; a dehydrate of zirconia sol; or a hydrolyzate of a zirconium alkoxide such as zirconium methoxide, zirconium ethoxide, zirconium propoxide or zirconium butoxide, particularly a tetraalkoxide thereof. The zircon may be natural zircon or synthetic zircon synthesized by the method of the present invention or by other methods.

Blending of starting materials

The blending ratio of silica to zirconia must be such that the $SiO_2/ZrO_2$ molar ratio (i.e. the Si/Zr atomic ratio) is 1 within an allowance of error in weighing. As is evident from the fact that zircon is represented by $SiO_2 \cdot ZrO_2$, an excess amount of either silica or zirconia will remain as an impurity in the zircon powder product irrespective of the firing conditions.

Zircon is added for the purpose of creating by its presence zircon nuclei in the feed powder mixture and letting the nuclei grow to form crystalline zircon. To make the zircon-forming rate sufficient, it is used in an amount of at least 0.1% by weight based on the total amount of silica and zirconia. However, even if it is added excessively, no corresponding improvement in effects can be obtained. Therefore, the upper limit is usually at most 10% by weight. Particularly when natural zircon is employed, impurities derived therefrom are likely to be included in the product, and therefore, the upper limit is preferably at most 1% by weight.

The silica and zirconia must be a powder mixture of silica and zirconia obtained by the liquid-removing treatment of a liquid having a pH of not higher than 8, because the surface of silica is thereby negatively charged, and the surface of zirconia is thereby positively charged so that they are mutually attracted to each other to form a homogeneous mixture of silica and zirconia, whereby zircon having an extremely high purity can be obtained. Such an effect can not obtained by mere mixing by a dry method. On the other hand, if the pH exceeds 8, the surface charge of zirconia becomes to be negative like silica, whereby both materials are repulsive against each other and can hardly make a homogeneous mixture, and accordingly, formation of zircon will thereby be impaired. The surface charges of zirconia and silica can be determined by measuring the ζ-potentials. Most of silica raw materials or zirconia materials do not make the pH higher than 8 when added to a neutral liquid. However, for example, among silica sols or zirconia sols, there are some commercial available products having the pH adjusted to a level higher than 8 with an addition of ammonia solution. When such commercial available products are to be used, it is necessary to lower the pH to a level of not higher than 8 by adding e.g. hydrochloric acid.

The silica and zirconia must be formed into a liquid in which there are dispersed in water or in an organic solvent. When the starting raw materials are powders, they are preferably mixed by a pulverizer such as a ball mill, a vibration mill or an attriter, which is commonly employed for mixing powders of ceramic raw material. Such mixing is preferably conducted by a wet method. The solvent to be used for the wet method may be any solvent so long as it is inert to the powders. For example, ethanol, butanol, water, acetone or toluene may be used. If the pH of the solvent exceeds 8, the pH is adjusted to a level of not higher than 8. The powders may usually be added in an amount of from 50 to 60 g per 100 ml of the solvent, followed by treatment by the above-mentioned pulverizer. If the concentration of the starting raw materials is too low, not only the productivity per unit volume of the treating tank will be poor, but also the energy consumption during the liquid removing treatment will be high. On the other hand, if the concentration of the starting raw materials is too high, the viscosity of the liquid will be high, and stirring will be difficult. The time for mixing is usually from 24 to 100 hours. Even if the mixing time is prolonged, no corresponding improvement in the effects will be obtained.

With respect to silica sol and zirconia sol, commercial available products may be used as they are i.e. in the form of aqueous sols. In these sols, the respective components are well dispersed. Therefore, when such sols are employed as the starting materials, it is possible to obtain a homogeneous powder mixture of starting raw materials. In this case, it is advisable to adjust the concentration to a level of from 10 to 30% by weight and to conduct mixing for from 5 to 48 hours. If the concentration is too high, the sol tends to be unstable, and if it is too low, too much a load will be required for the liquid-removal. In general, the stirring time should better be long to obtain a homogeneous mixture. However, even if it is prolonged too much, no substantial further improvement in the effects is obtainable.

When an alkoxide is to be used as the starting raw material, it is dissolved in a non-aqueous solvent such as an alcohol having the same alkyl group, toluene, acetone or hexane, and to the solution thus obtained, water is added in an amount of at least the stoichiometric amount to hydrolyze the alkoxide. This organic solvent is used in an amount sufficient to make the homogeneous solution. Usually, it is from 20 to 100 times by weight relative to the respective alkoxides. When alkoxides are employed for both silica and zirconia starting raw materials, the alkoxide of the latter has a higher hydrolyzing rate than the alkoxide of the former, and when a homogeneous solution of both materials is hydrolyzed, zirconia precipitates faster than silica, whereby it becomes difficult to obtain a homogeneous mixture of precipitates of both materials. By permitting the zirconium alkoxide to form a chelate with the chelate agent such as 2,4-pentanediol, butane-2,3-diol or 2-methyl-2,4-pentanediol, it is possible to slow down the hydrolytic rate of the zirconium alkoxide and to let it be close to the hydrolytic rate of the silicon alkoxide. If such a chelate is mixed after the silicon alkoxide has been partially hydrolyzed, the hydrolytic rates of the two materials can more readily be matched. This method is particularly effective when tetraalkoxysilane is employed, since tetraalkoxysilane has the slowest hydrolytic rate among various silicon alkoxides. The chelate agent is used at least the stoichiometric amount relative to the zirconium alkoxide. However, if it is used too much i.e. more than 4 times by weight of the zirconium alkoxide, a part of the chelate agent remain as it was unreacted and to make a chelate with the silicon alkoxide to delay also the hydrolytic rate thereof, whereby the object of adjusting the hydrolytic rate will be hardly accomplished. These operations are conducted in the above-mentioned non-aqueous solvent. The solvent is used in an amount sufficient to make the homogeneous solution, and the amount is usually from 20 to 100 times by weight relative to the alkoxides.

The two alkoxide solutions thus obtained are mixed, and water is added to the mixture for hydrolysis to obtain a liquid containing preparation gel, wherein silica and zirconia are uniformly dispersed. The hydrolysis can be conducted by water in an amount of at least the stoichiometric amount. However, since the hydrolytic rate of the silicon alkoxide is slow, water is usually used in an amount within a range of from 5 to 10 times of the stoichiometric amount. The pH of a mixture thus obtained is usually not higher than 8. However, the pH is preferably lowered before the solution was hydrolyzed also with a view to increasing the hydrolytic rate. Namely, water having the pH adjusted to a level of from 1 to 4 with hydrochloric acid, is added in an amount of from 1 to 2 equivalent times to the organic solvent having the silicon alkoxide dissolved therein, then, the mixture is stirred at a temperature of from 40° to 50° C. for from 3 to 10 hours to partially hydrolyze the silicon alkoxide, then a chelate of zirconia is mixed thereto, and the hydrolysis is completed, whereby a homogeneous mixture of silica and zirconia can be obtained.

The liquid prepared as described above, is subjected to drying treatment to obtain a homogeneous mixture of silica and zirconia. This drying can be conducted by various methods. However, it is usually preferred to employ spray drying or evaporation to dryness under atmospheric pressure or under reduced pressure, since it is directed to treatment of fine powder dispersed in a large amount of a liquid.

In the present invention, zircon must be present in the powder mixture to be fired. However, there is no particular restriction as to the manner of its incorporation. Namely, zircon may be added at any stage such as prior to the liquid-removing treatment, during the liquid-removing treatment or after the liquid-removing treatment.

Firing

The powder mixture prepared as described above, is fired at a temperature of from 1,300° to 1,700° C. after the following heating schedule. If the calcination temperature is lower than 1,300° C., silica and zirconia can not adequately be reacted. On the other hand, if it is higher than 1,700° C., the product is likely to decompose into silica and zirconia. If the firing time is too short, formation of zircon will of course be inadequate, whereby unreacted silica and zirconia will remain. This mixture is calcined at a temperature of from 1,300° to 1,700° C. for a period of at least one hour. It is able to obtain the high purity zircon.

As described above, it is necessary to calcine at 1,300° to 1,700° C. to complete the reaction of silica and zirconia. In order to obtain zircon having excellent sinterability, i.e. zircon having a small particle size, it is necessary to adjust the calcination conditions as described hereinafter. Further, in order to shorten the calcination time to increase the productivity and yet to obtain zircon having a small particle size, it is necessary to delicately adjust the calcination conditions.

In a case where in the preparation of the feed powder mixture, drying is inadequate and water or an organic solvent still remains in the mixture, the heating rate should better be as small as possible until such a liquid has completely evaporated. If the heating rate is too high, the powder is likely to coagulate with the remained liquid, whereby the product zircon powder tends to have a large particle size and will be a product having poor sinterability. Such coagulation can be avoided by adjusting the heating rate to a level of not higher than 10° C./min to the temperature of about 700° C.

Namely, except for the case where a liquid is contained in the feed powder mixture as described above, any heating pattern may be taken up to a temperature of 700° C.

Probably due to a role of zircon in the feed powder mixture, crystal nucleation reaction is started, and both the speed of the increase in number of the crystal nuclei and the speed of the growth of zircon particles increase as the temperature increases. However, the lower the temperature, the higher the speed of the increase in number of the crystal nuclei as compared with the speed for the growth of the particles. On the other hand, the higher the temperature, the higher the speed of the growth of the particles as compared with the speed of the increase in number of the crystal nuclei. Namely, in order to obtain fine zircon powder, it is better that the feed powder mixture is held for a long period of time in the relatively low temperature range of from 700° C. to the calcination temperature so that the number of crystal nuclei of zircon is increased as much as possible, followed by completing the conversion to zircon at a higher temperature region.

Specifically, it is possible to obtain zircon having a fairly small particle size and a high purity (i.e. with small contents of unreacted silica and zirconia) by controlling the heating rate from 1,200° C. to the calcination temperature at a level of not higher than 5° C./min, preferably not higher than 2° C./min, even without particularly controlling the heating conditions up to 1,200° C., since up to 1,200° C., both the speed of the increase in number of crystal nuclei and the speed of the growth of particles are small.

In order to obtain a product having a very small particle size, it is advisable to maintain the mixture within a temperature range of from 700° to 1,200° C. where the growth of particles is slow, as long as possible so as to form crystal nuclei as many as possible during this period. Namely, if the period for the temperature range of from 700° C. to 1,200° C. is more than 16 hours, it is possible to obtain a product having a very small particle size and a very high purity by maintaining the mixture at a temperature of from 1,300° to 1,700° C. for at least 10 hours even without particularly controlling the heating conditions within a temperature range of from 1,200° to 1,300° C., since within this temperature range, formation of crystals is only slightly more active than the growth thereof. From the viewpoint of the interrelation between the particle size of the product and the time for firing treatment, it is more preferred to take from 20 to 90 hours for raising the temperature from 700° to 1,200° C. and from 10 to 50 hours for maintaining the temperature within a range of from 1,300° to 1,700° C.

As is apparent from the foregoing description, according to the present invention, it is possible to obtain synthetic zircon powder having a small particle size and not containing oxides which constitute impurities to zircon. Accordingly, when the product powder is sintered, it is possible to obtain a sintered product having excellent mechanical properties both at room temperature and at high temperatures.

Now, the present invention will be described in further detail with reference to Examples and Comparative Examples. However, it should be understood that the present invention is by no means restricted by such specific Examples.

In the following Examples and Comparative Examples, the detection of components in the product zircon powder was made by four peaks at (200) of zircon, (111) and (1̄11) of monoclinic zirconia and (101) of zirconia at $2\theta = 26$ to $32°$ by the X-diffraction analysis. The production rate of zircon was obtained by the formula:

$$I(200)/\{I(200)+I(111)+I(\bar{1}11)+I(101)\}$$

wherein I indicates the intensity of X-rays, and the numerals in the bracket ( ) indicates the above miller index.

Further, the average particle size of the product zircon powder was measured by the observation by means of a scanning electron microscope.

EXAMPLES 1 to 6 and COMPARATIVE EXAMPLES 1 to 4

An ethanol solution of tetraethoxysilane (concentration: 170 g/l), hydrochloric acid (concentration 32 wt %) and water were mixed in a molar ratio of Si(OC$_2$H$_5$)$_4$:HCl:H$_2$O of 10:1:20 to obtain a liquid having pH2, which was refluxed at 75° C. for 50 hours to obtain a solution of a partial hydrolyzate of tetraethoxysilane.

Separately, a butanol solution of tetraisopropoxyzirconium (concentration: 400 g/l) in an equimolar amount as the above tetraethoxysilane and 2-methyl-2,4-pentanediol were mixed in a molar ratio of 2-methyl-2,4-pantanediol/tetraisopropoxyzirconium of 2/1 (provided 10/1 in Example 6, and 0/1 in Comparative Example 2) and refluxed at 50° C. until they are completely uniformly dissolved to obtain a solution of a chelate of tetraisopropoxyzirconium.

The solution of a partially hydrolyzated tetraethoxysilane and the solution of a chelate compound of tetraisopropoxyzirconium thus obtained, were mixed and dissolved in water in an amount of 10 times by volume, and the solution was stirred at room temperature for 5 hours. The obtained gel-like precipitates were separated by repeating decantation and washing with water, followed by drying under heating at 800° C. for one hour. Then, natural zircon powder was added thereto, and the mixture was mixed for 24 hours by a ball mill. Then, the mixture was heated to a calcination temperature at a heating rate of 2° C./min and maintained at the calcination temperature for one hour for firing.

The conditions other than those described above and the components of the product are shown in Table 1.

EXAMPLES 7 to 16 and COMPARATIVE EXAMPLES 5 to 12

Firstly, a powder mixture of silica and zirconia was prepared as follows:

(1) Zirconia powder (TOSOH CORPORATION) and silica powder (Nippon Aerosil K.K.) were weighed so that the Si/Zr atomic ratio became 1 and added to ethanol. The pH was adjusted to 7 with 1N hydrochloric acid, and the mixture was mixed by a ball mill using zirconia balls. The mixture thus obtained was subjected to drying treatment under reduced pressure at 80° C. for 2 hours by an evaporator.

(2) Zirconia sol (concentration 20 wt %, manufactured by Nissan Chemical Industries Ltd.) and silica sol (concentration: 20 wt %, manufactured by Nissan Chemical Industries Ltd.) were weighed so that the Si/Zr atomic ratio became 1, and the pH was adjusted to a level of from 5 to 5.5 with 1N aqueous ammonia, and the mixture was stirred for one hour by means of a separatory flask. A dispersion of silica and zirconia thus obtained was subjected to drying treatment at 80° C. for 2 hours under reduced pressure by an evaporator.

To the powder obtained as described above, natural zircon was added, and the powder mixture thus obtained was mixed for 24 hours in ethanol by a ball mill using zirconia balls. This powder mixture was then subjected to drying treatment for 2 hours at 80° C. under reduced pressure by means of an evaporator.

The mixture thus obtained was maintained at the calcination temperature for one hour in atmosphere to obtain synthetic zircon powder.

The conditions other than those mentioned above and the results are shown in Table 2.

EXAMPLES 17 to 26 and COMPARATIVE EXAMPLES 13 to 20

Firstly, a liquid having silica and zirconia dispersed therein was prepared as follows.

(1) Zirconia powder (manufactured by TOSOH CORPORATION) and silica powder (manufactured by Nippon Aerosil K.K.) were weighed so that the Si/Zr atomic ratio became 1 and added to ethanol. The pH was adjusted with 1N hydrochloric acid, and the mixture was mixed for 48 hours by a ball mill using zirconia balls.

(2) Zirconia sol (concentration 20% by weight, manufactured by Nissan Chemical Industries Ltd.) and silica sol (concentration 20% by weight, manufactured by Nissan Chemical Industries Ltd.) were weighed so that the Si/Zr atomic ratio became 1 and mixed for one hour by a separatory flask. At that time, the pH of the mixture was adjusted with 1N aqueous ammonia.

(3) An ethanol solution of tetraethoxysilane (concentration: 170 g/l), hydrochloric acid (concentration: 32% by weight) and water were mixed in a molar ratio of $Si(OC_2H_5)_4:HCl:H_2O$ of 10:1:20, to obtain a liquid of pH2, which was refluxed at 75° C. for 50 hours to obtain a solution of a partially hydrolyzated tetraethoxysilane.

Separately, a butanol solution of an equimolar amount of tetraisopropoxy zirconium as the above tetraethoxysilane (concentration: 400 g/l) and 2-methyl-2,4-pentanediol were mixed in a molar ratio of 2-methyl-2,4-pentanediol/tetraisopropoxy zirconium of 2/1 and refluxed at 50° C. until the mixture was uniformly dissolved to obtain a solution of a chelate compound of tetraisopropoxy zirconium.

The solution of a partially hydrolyzated tetraethoxysilane and the solution of a chelate compound of tetraisopropoxy zirconium thus obtained, were mixed and dissolved in water in an amount of 10 times by volume, and stirred at room temperature for 10 hours. At that time, the pH was adjusted with 1N aqueous ammonia.

The mixture obtained as described above, was subjected to drying treatment for 2 hours at 80° C. under reduced pressure by an evaporator. To the powder thereby obtained, natural zircon was added, and this powder mixture was mixed for 24 hours in ethanol by a ball mill using zirconia balls.

This powder mixture was then subjected to drying treatment for 2 hours at 80° C. under reduced pressure by an evaporator. The mixture thus obtained was heated at the fixed heating rates from 700° C. to 1,200° C. and from 1,200° C. to the calcination temperature (provided that the calcination time from 1,300° to 1,700° C. was as shown in Table 3) and fired in atmosphere to obtain a synthetic zircon powder.

The conditions other than those mentioned above and the results are shown in Table 3.

TABLE 1

|  | Amount of natural zircon added to the gel product (wt %) | Calcination temp. (°C.) | Forming rate of zircon (%) | Average particle size of formed powder (μm) |
|---|---|---|---|---|
| Example 1 | 0.1 | 1500 | 80.5 | 4.5 |
| Example 2 | 1.0 | 1500 | 85.0 | 5.0 |
| Example 3 | 10 | 1500 | 85.0 | 5.0 |
| Example 4 | 1.0 | 1300 | 70.5 | 2.5 |
| Example 5 | 1.0 | 1700 | 88.5 | 5.3 |
| Example 6 | 1.0 | 1500 | 88.0 | 5.0 |
| Comparative Example 1 | 0.05 | 1500 | 30.5 | — |
| Comparative Example 2 | 1.0 | 1500 | 10.5 | — |
| Comparative Example 3 | 1.0 | 1100 | 26.3 | — |
| Comparative Example 4 | 1.0 | 1800 | 10.8 | — |

TABLE 2

|  | Silica raw material | Zirconia raw material | Calcination temp. (°C.) | Amount of zircon added (wt %) | Heating rate at 1200° C. (°C./min) | Forming rate of zircon (%) | Average particle size of formed powder (μm) |
|---|---|---|---|---|---|---|---|
| Example 7 | Silica powder | Zirconia powder | 1500 | 1.0 | 5.0 | 70.5 | 6 |
| Example 8 | Silica powder | Zirconia powder | 1500 | 1.0 | 0.1 | 88.0 | 4 |
| Example 9 | Silica sol | Zirconia sol | 1500 | 1.0 | 5.0 | 75.0 | 4 |
| Example 10 | Silica sol | Zirconia sol | 1500 | 1.0 | 0.1 | 90.3 | 2 |
| Example 11 | Silica sol | Zirconia sol | 1300 | 1.0 | 5.0 | 72.0 | 2 |
| Example 12 | Silica sol | Zirconia sol | 1300 | 1.0 | 0.1 | 80.0 | 2 |
| Example 13 | Silica sol | Zirconia sol | 1700 | 1.0 | 5.0 | 85.0 | 3 |
| Example 14 | Silica | Zirconia | 1700 | 1.0 | 0.1 | 100.0 | 2 |

TABLE 2-continued

| | Silica raw material | Zirconia raw material | Calcination temp. (°C.) | Amount of zircon added (wt %) | Heating rate at 1200° C. (°C./min) | Forming rate of zircon (%) | Average particle size of formed powder (μm) |
|---|---|---|---|---|---|---|---|
| Example 15 | Silica sol | Zirconia sol | 1500 | 0.1 | 5.0 | 73.0 | 4 |
| Example 16 | Silica sol | Zirconia sol | 1500 | 0.1 | 0.1 | 91.4 | 2 |
| Comparative Example 5 | Silica powder | Zirconia powder | 1200 | 1.0 | 5.0 | 1.0 | 3 |
| Comparative Example 6 | Silica powder | Zirconia powder | 1500 | 0.0 | 5.0 | 5.2 | 10 |
| Comparative Example 7 | Silica powder | Zirconia powder | 1800 | 1.0 | 5.0 | 2.0 | 20 |
| Comparative Example 8 | Silica powder | Zirconia powder | 1500 | 1.0 | 30.0 | 10.0 | 20 |
| Comparative Example 9 | Silica sol | Zirconia sol | 1200 | 1.0 | 5.0 | 1.2 | 2.5 |
| Comparative Example 10 | Silica sol | Zirconia sol | 1500 | 0.0 | 5.0 | 15.0 | 7 |
| Comparative Example 11 | Silica sol | Zirconia sol | 1800 | 1.0 | 5.0 | 5.2 | 18 |
| Comparative Example 12 | Silica sol | Zirconia sol | 1500 | 1.0 | 30.0 | 25.2 | 15 |

TABLE 3

| | Zirconia raw material | Silica raw material | pH of the solvent | 1,300 1,700 (°C.) (hr) | 1,300 1,700 (°C.) (hr) | Calcination temp. (°C.) | Forming rate of zircon (%) | Amount of zircon added (wt %) | Average particle size (μm) |
|---|---|---|---|---|---|---|---|---|---|
| Example 17 | Zirconia powder | Silica powder | 7.0 | 70 | 47 | 1500 | 98.0 | 1.0 | 0.60 |
| Example 18 | Zirconia powder | Silica powder | 7.0 | 80 | 47 | 1500 | 99.2 | 1.0 | 0.51 |
| Example 19 | Zirconia sol | Silica sol | 5.5 | 70 | 47 | 1500 | 99.5 | 1.0 | 0.48 |
| Example 20 | Zirconia sol | Silica sol | 5.5 | 24 | 47 | 1600 | 98.3 | 1.0 | 0.71 |
| Example 21 | Zirconia sol | Silica sol | 5.5 | 24 | 80 | 1300 | 95.3 | 1.0 | 0.51 |
| Example 22 | Zirconia sol | Silica sol | 5.5 | 80 | 10 | 1300 | 96.0 | 1.0 | 0.45 |
| Example 23 | Zirconia sol | Silica sol | 3.0 | 70 | 47 | 1500 | 98.0 | 1.0 | 0.57 |
| Example 24 | Zirconia sol | Silica sol | 3.0 | 24 | 80 | 1300 | 94.4 | 1.0 | 0.59 |
| Example 25 | TIPZr | TESi | 3.0 | 70 | 47 | 1500 | 99.1 | 1.0 | 0.49 |
| Example 26 | TIPZr | TESi | 2.0 | 70 | 47 | 1500 | 98.5 | 1.0 | 0.54 |
| Comparative Example 13 | Zirconia powder | Silica powder | 7.0 | 16 | 62 | 1800 | 14.1 | 1.0 | 6.8 |
| Comparative Example 14 | Zirconia sol | Silica sol | 10.0 | 70 | 47 | 1500 | 21.0 | 1.0 | 5.3 |
| Comparative Example 15 | Zirconia sol | Silica sol | 5.5 | 70 | 1.2 | 1500 | 42.1 | 1.0 | 5.3 |
| Comparative Example 16 | Zirconia sol | Silica sol | 5.5 | 5 | 1.2 | 1500 | 26.0 | 1.0 | 5.6 |
| Comparative Example 17 | Zirconia sol | Silica sol | 5.5 | 70 | 47 | 1800 | 15.5 | 1.0 | 7.3 |
| Comparative Example 18 | Zirconia sol | Silica sol | 5.5 | 70 | 17 | 1500 | 31.5 | 0.0 | 3.0 |
| Comparative Example 19 | TIPZr | TESi | 3.0 | 70 | 47 | 1800 | 16.2 | 1.0 | 5.9 |
| Comparative Example 20 | TIPZr | TESi | 10.0 | 70 | 47 | 1500 | 28.0 | 1.0 | 5.0 |

We claim:
1. A method of preparing zircon powder, which comprises:
heating a feed powder mixture comprising:
(1) silica and zirconia obtained by removing liquid from a liquid medium having a pH of not higher than 8 and containing silica and zirconia in a $SiO_2/ZrO_2$ molar ratio of substantially 1/1, and
(2) zircon in an amount of at least 0.1% by weight based on the total amount of said silica and zirconia, from 700° to 1,200° C. over a period of at least 16 hours, heating the mixture at a heating rate of not higher than 5°C./min from 1,200° C. to a calcination temperature, and maintaining the mixture at a calcination temperature of from 1,300° to 1,700° C. from 1.0 to 24 hours.

2. The preparation method for zircon powder according to claim 1, wherein the liquid having a pH of not higher than 8 and containing silica and zirconia in a $SiO_2/ZrO_2$ molar ratio of substantially 1/1, is obtained by dissolving (1) a silicon alkoxide and (2) a reaction mixture of a zirconium alkoxide with a chelating agent, in an organic solvent and contacting the resulting mixed solution with at least the stoichiometric amount of water for hydrolysis.

3. The preparation method for zircon powder according to claim 2, wherein the silicon alkoxide is a partial hydrolyzate of a tetraalkoxysilane, and the reaction mixture of a zirconium alkoxide with a chelating agent, is a reaction mixture of a zirconium alkoxide with from the stoichiometric amount to 4 times the stoichiometric amount of a chelating agent.

4. The preparation method for zircon powder according to claim 1, wherein the liquid having a pH of not higher than 8 and containing silica and zirconia in a $SiO_2/ZrO_2$ molar ratio of substantially 1/1, is a mixture of a silica sol and a zirconia sol.

5. The method for synthesizing zircon powder according to claim 1, wherein the zircon in the feed powder mixture is synthesized zircon, and its content is from 0.1 to 10% by weight based on the total amount of said silica and zirconia.

6. The preparation method for zircon powder according to claim 1, wherein the zircon in the feed powder mixture is natural zircon and its content is from 0.1 to 1% by weight based on the total amount of said silica and zirconia.

7. The method for synthesizing zircon powder according to claim 1, wherein said silica is white carbon, dehydrated silica sol, an oxidized single silicon substance or a hydrolyzate of silicon alkoxide.

8. The method for synthesizing zircon powder according to claim 1, wherein said zirconia is dehydrated zirconia sol or a hydrolyzate of zirconium alkoxide.

* * * * *